May 18, 1943. R. E. SAVING ET AL 2,319,480
ADJUSTABLE MICROMETER DIAL
Filed Nov. 27, 1939 2 Sheets-Sheet 2
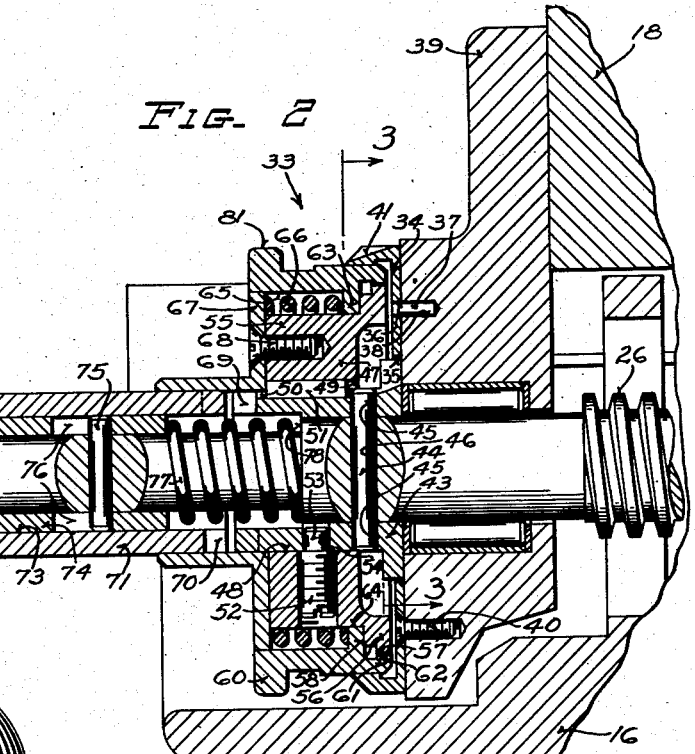
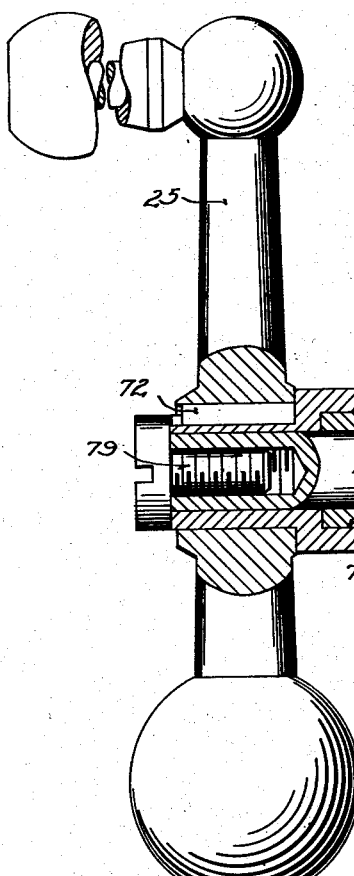
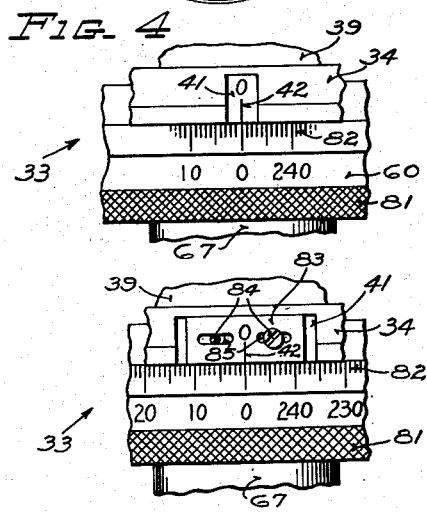
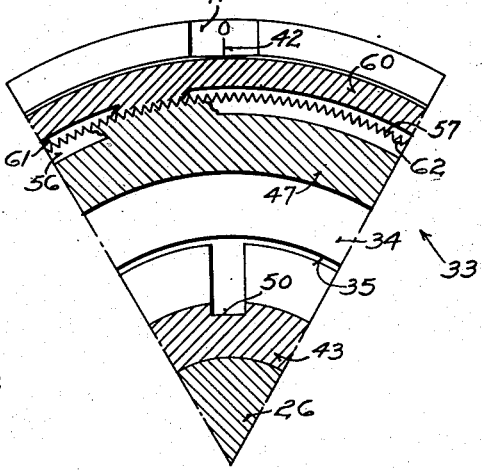
INVENTORS
EDWARD GUETZKOW
RALPH E. SAVING
BY W. D. O'Connor
ATTORNEY Patented May 18, 1943

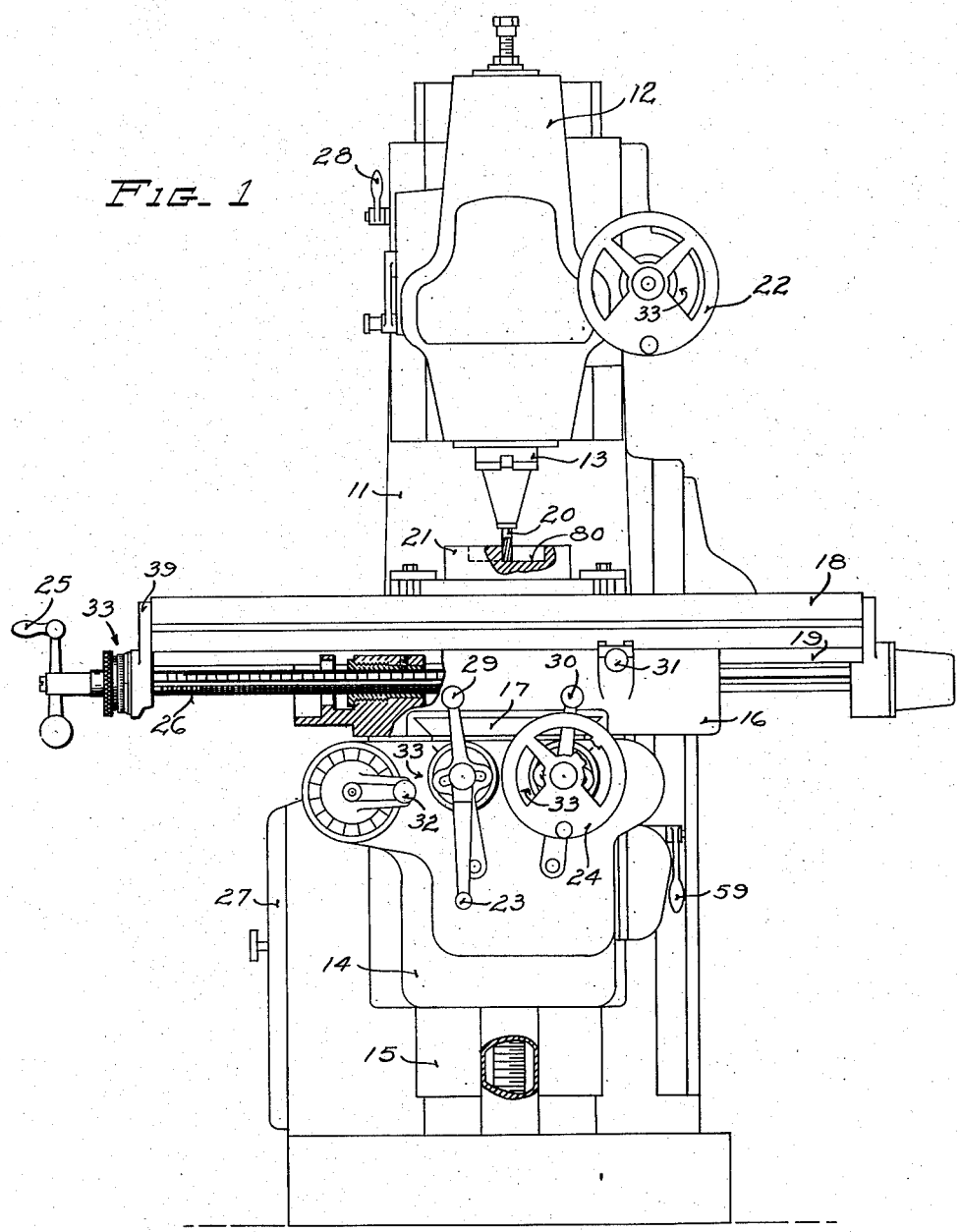

2,319,480

UNITED STATES PATENT OFFICE 2,319,480

ADJUSTABLE MICROMETER DIAL

Ralph E. Saving, Wauwatosa, and Edward Guetzkow, West Allis, Wis., assignors to Kearney & Trecker Corporation, West Allis, Wis., a corporation of Wisconsin Application November 27, 1939, Serial No. 306,252

29 Claims. (Cl. 90—21)

This invention relates generally to machine tools and more particularly to an improved adjustable precision indicating mechanism for indicating accurately the position of a movable element of a machine tool.

In machine tools having movable elements operated by rotatable actuating means such as driving screws, arrangements are usually made for ascertaining the position of each element by reference to an indicating dial or the like associated with the actuating means and presenting graduations disposed to cooperate with a stationary indicator. To provide for initially setting the indicating apparatus, the indicating dial is usually arranged for angular adjustment relative to the actuating member in manner to permit the zero mark of the dial to be moved into register with the fixed indicator mark. This has ordinarily been accomplished heretofore by providing a set screw or other frictional coupling means between the dial and its supporting element. In machines in which movement of the elements is effected manually or by power at relatively low speed, frictional adjusting means of this nature have been found to be generally satisfactory. However, in machines in which the movable elements are driven by power at relatively high speeds and are subjected to sudden changes in speed or direction of movement, the inertial forces acting upon the indicating dials are sometimes sufficient to cause the frictional couplings to slip, thereby permitting the angular position of the dial to change. This results in destroying the accuracy of the reading indicated by the dial, and in some instances may cause the frictional coupling to be tightened to such an extent that difficulty is encountered in releasing it for readjusting the dial.

A general object of the present invention is to provide an improved position indicating apparatus for a movable element of a machine tool.

Another object of the invention is to provide an adjustable position indicating dial that is especially adapted to resist displacement by inertial forces.

Another object is to provide an improved indicating dial mechanism that is capable of being adjusted readily to change its angular position and that is locked positively in its adjusted position.

Another object is to provide an adjustable position indicating dial especially adapted for use with a power driven element of a machine tool and that is capable of being locked in its adjusted position in manner to resist displacement by inertial forces resulting from power operation of the machine element.

Another object is to provide an adjustable indicating dial having toothed clutching engagement with its cooperating supporting member to provide for angular adjustment and for positive locking engagement in the adjusted position.

According to this invention, a machine tool having a movable element arranged to be actuated either manually or by power is provided with improved means for indicating accurately the position of the element, the indicating means being adjustable and especially adapted to resist change in adjustment under the influence of inertial forces resulting from power operation of the element. For this purpose, the usual feed screw for moving the element is provided with an improved adjustable micrometer dial arranged to cooperate with a stationary indicator. To provide for adjustment of the dial relative to the feed screw for registering the zero of the dial with the stationary indicator, the dial mechanism is formed in two parts having interlocking toothed clutching engagement. One part of the dial mechanism is secured to the feed screw and presents circumferentially arranged teeth or serrations adapted to be engaged by complementary serrations on the other relatively adjustable dial element, the latter being inscribed with the position indicating graduations. A spring is utilized to retain the complementary serrations in meshing engagement, adjustment of the mechanism being effected by withdrawing the graduated part of the dial against the action of the spring and turning it to a new position in which the matching serrations are reengaged by the force of the spring. Since the engagement of the serrations is of positive clutching nature, the dial will be retained in adjusted position regardless of inertial forces resulting from changes in speed or direction of rotation of the feed screw. For effecting precise registration of a selected mark on the dial with the indicator, the indicator mark may be carried by a member providing for adjusting movement thereof. With the dial adjusted to the zero position, the feed screw may be actuated manually to move the element through a precisely predetermined distance as indicated by reading the dial in cooperation with the indicator.

In the illustrated embodiment of the present invention, the pitch of the feed screw for effecting movement of the adjustable part of the machine tool is one-quarter of an inch and the graduated dial carries two hundred and fifty equally spaced graduations. Accordingly, the advance of one graduation on the dial represents an advance of one-one thousandth of an inch of the adjustable part of the machine.

The foregoing and other objects of this invention, which will become more fully apparent from the following detailed specification, may be achieved by means of the particular improved adjustable micrometer dial constituting an exemplifying embodiment of the invention that is illustrated in and described in connection with the accompanying drawings, in which:

Figure 1 is a view in front elevation of a milling machine equipped with manually operable precision adjusting mechanism including an adjustable graduated micrometer dial embodying the novel features of the prevent invention, parts of the machine having been broken away to show the adjusting mechanism.

Fig. 2 is an enlarged vertical longitudinal sectional view taken along the axis of the table feed screw of the machine shown in Fig. 1 and illustrating the structure of the adjustable graduated micrometer dial mechanism;

Fig. 3 is an enlarged vertical transverse sectional view taken on the line 3—3 of Fig. 2 showing the positively engaging serrated portions of the dial collar and graduated dial element;

Fig. 4 is a fragmentary top elevational view of the dial mechanism, showing the cooperating relationship between the fixed indicator on the machine table and the graduations on the dial element; and Fig. 5 is a fragmentary top elevational view similar to Fig. 4 but showing an adjustable carrier for the indicator mark so arranged that it may be brought into exact register with the zero mark on the graduated dial.

Referring more particularly to the drawings, the machine tool there illustrated as exemplifying typical apparatus with which the adjustable precision indicating mechanism embodying the present invention may be utilized to advantage, is a milling machine of the vertical-spindle, knee and column type. As shown in Fig. 1, the machine comprises essentially an upstanding column structure 11 constituting the supporting base or frame of the machine and carrying at its upper forward end a vertically adjustable spindle head 12 in which a vertically disposed tool carrying spindle 13 is journalled. Beneath the spindle 13 is arranged the usual work-supporting structure consisting of movable elements including a knee 14 slidably mounted for vertical adjustment along ways 15 formed on the column 11. The knee is arranged to carry on its upper surface a saddle 16 slidably mounted for horizontal cross feeding movement toward and from the column on ways 17 formed on the knee. The saddle carries a work-supporting table 18 slidably mounted on ways 19 for longitudinal feeding movement in cooperating relationship with a rotary cutting tool 20 mounted in the tool spindle 13.

A workpiece, such as piece 21 illustrated in Fig. 1, may be supported on the table 18 and secured thereto in the usual manner by means of clamps or the like, in position to be engaged by the rotary cutting tool 20 mounted in the tool spindle 13. The cutting tool 20 may be fed downward into the workpiece or retracted therefrom by manipulating a hand wheel 22 that functions to move the spindle supporting head 12 vertically. Alternatively, the piece may be moved upward into engagement with the cutter or retracted therefrom by manipulating a hand crank 23 on the knee which serves to move the knee vertically along the ways 15 on the face of the column 11. Horizontal cross feeding movement of the workpiece 21 may be effected by manipulating a hand wheel 24 which serves to move the saddle 16 toward or from the column along the ways 17 on the knee 14. Likewise, horizontal longitudinal movement of the table 18 may be effected by manipulating a hand crank 25 which serves to rotate a feed screw 26 within a cooperating nut to move the table along the ways 19 on the saddle 16.

The various movements of the work-supporting structure and the spindle head may also be effected by power at feed rate or at rapid traverse rate in a well known manner, the power being supplied by a motor (not shown) housed in a motor compartment in the base of the column that is accessible by opening a door 27, the motor functioning also to drive the spindle 13 in the usual manner. Power operation of the knee may be effected, whenever a starting clutch lever 28 is in operating position, by moving a lever 29 mounted on the front of the knee, as shown in Fig. 1, to the left or right. When the lever 29 is moved to the left, as viewed in Fig. 1, the knee will descend, when moved to the right the knee will be elevated under power. The saddle 16 may be moved toward and from the column under power by moving a lever 30 to the left or right. When the lever 30 is moved to the left, as viewed in Fig. 1, the saddle will move outwardly from the column, when moved to the right, the saddle will move inwardly toward the column. The table 18 may be power driven to the left or to the right by moving a lever 31 to its left or its right extreme position respectively. The several control levers 28, 29, 30 and 31 are each shown in the drawing in neutral position from which they may be moved selectively to their various operative positions to effect desired movements of the several work-supporting elements.

The rate of feeding movement of the knee, saddle or table may be established by a feed rate controlling lever 32 and associated dial indicator mechanism that functions in a well known manner. The knee, saddle and table are each provided with tripping mechanisms, including trip dogs which engage power declutching mechanisms to limit the extent of power movement of each of the several elements. Movement of any of the elements at rapid traverse rate in the direction established by the associated control lever, may be effected by moving a rapid traverse lever 59 upward into clutch engaging position.

Since the inertial forces existing in the moving mechanism of the knee, saddle and table and likewise other factors such as the frictional forces and the cutting force of the rotary tool differ under various conditions of operation, the position at which any one of the elements will stop when the power connection to the element is interrupted either manually or automatically will vary. Accordingly, in order to achieve exact positioning of the workpiece 21 with respect to the cutting tool 20, it is desirable to provide manually operable precision adjusting means having in conjunction therewith an improved micrometer dial that functions to indicate accurately the measure of movement of the workpiece with respect to the tool, in accordance with the present invention.

As shown in the drawings, the particular manually operable precision adjusting means there illustrated as a preferred embodiment of the invention, includes a graduated adjustable micrometer dial mechanism 33 adapted to be operatively associated with each of the operating mechanisms for effecting movement of the spindle head 12, the knee 14, the saddle 16 and the work-supporting table 18. The dial 33 for indicating the measure of movement of the table 18 is operatively connected to rotate with the table driving feed screw 26. The dial 33 for indicating the measure of movement of the saddle 16 is operatively associated with the saddle cross feed screw, and the dials 33 for indicating the measure of movement of the knee 14 and of the head 12 are operatively associated with the respective elevating screws.

For the purpose of simplifying the description, only the adjustable micrometer dial mechanism 33 associated with the table feed screw 26 will be described in detail, it being understood that the remaining dials are identical in structure and operation. As shown in Fig. 2, the position indicating structure comprising the dial mechanism 33 includes a cooperating stationary indicator plate 34 having a centrally disposed aperture 35 adapted to pass over the end of the table feed screw 26. The plate 34 is provided with a drilled hole 36 for receiving the extended portion of a locating pin 37 which is pressed into a drilled hole 38 in an end bracket 39 attached to the table 18. A plurality of screws 40 (only one of which is shown) serve to secure the plate 34 rigidly to the end bracket 39. The circumferential edge of the plate 34 is provided with a flattened portion 41 on which is etched a zero mark 42 constituting a fixed indicator or reference mark.

The rotatable part of the dial mechanism includes a collar 43 slidably received on the feed screw 26 and secured thereon in fixed position by means of a pin 44 pressed into aligned holes 45 and 46 respectively located in the collar 43 and in the feed screw 26. The collar 43 serves a dual purpose, one as a portion of a clutch for engagement by the hand crank 25 to actuate the table screw and the other as a mounting means for a part of the dial mechanism 33. For the latter purpose, a dial supporting collar 47 provided with a bore 48 is slidably received on the collar 43. Cooperating key slots 49 and 50 formed respectively in the collar 43 and in the dial supporting collar 47 are adapted to receive a key 51 which provides a fixed driving connection between the two collars. A set screw 52 threadedly received in the collar 47 is provided with a reduced end portion 53 extending into a hole 54 formed in the collar 43 to insure against relative axial movement between the collars 43 and 47. The fixed dial supporting collar 47 is provided with a cylindrical hub 55 and an outwardly extending flange portion 56 having a peripheral portion of reduced width provided with circumferentially arranged locking teeth or serrations 57. The forward face 58 of the flange 56 serves as an abutment for engaging an indicia carrying, adjustably associated companion part 60 of the dial mechanism 33. The companion part 60 of the dial comprises a hollow cylindrical element presenting peripheral distance measuring indicia or graduations and provided at its inner end with an inwardly directed flange 61, the internal edge of which is provided with teeth or serrations 62 complementary to and adapted to be slidably meshed in positive interlocking engagement with the serrations 57 on the fixed dial collar 47. The cooperating toothed portions 57 and 62 constitute interlocking abutments or projections that form the complementary elements of a claw or dog clutch arranged to be releaseably retained in engagement at selected angular positions. By reason of the intermeshing serrations, the graduated element 60 of the dial mechanism may be adjusted angularly relative to the feed screw and then positively interlocked with the collar 47 fixed thereon in the adjusted position in manner to prevent its displacement by inertial forces such as result from sudden engagement of the rapid traverse drive or reversal into movement in the opposite direction at rapid traverse rate.

A web 63 within the element 60 intermediate the ends thereof is provided with a centrally disposed bore 64 which is slidably receivable over the cylindrical hub 55 of the collar 47. A recess 65 formed at one side of the web 63 serves as a chamber for the receipt of a coil spring 66 which normally releaseably retains the serrated elements together by exerting pressure inwardly against the web 63 to retain it in contact with the face 58 of the flange 56 on the collar 47. The coil spring 66 is retained in position by a cap 67 secured to the end of the hub portion 55 of the dial collar 47 by means of screws 68 (only one of which is shown).

The cap 67 includes a sleeve portion forming a guard or cover for a jaw clutch formed by cooperating teeth 69 and 70 respectively on the collar 43 and on the inner end of a sleeve 71. The sleeve 71 is slidably received over a reduced end of the table screw 26 and has the hand crank 25 applied thereto by any suitable means such as a key 72. A counterbore 73 formed in the sleeve 71 is of such diameter as to be slidably received over a sleeve bearing 74 retained for limited movement on the table feed screw 26 by means of a pin 75, the ends of which lie in longitudinally disposed slots 76 in the bearing. The pin 75 serves to limit outward movement of the bearing sleeve under the action of a coil spring 77 slidably received over the reduced end of the feed screw 26 and retained between a shoulder 78 formed on the table feed screw 26 and the inner end of the sleeve bearing 74. The crank handle assembly is retained on the feed screw 26 by a screw 79 threaded into a hole in the end of the feed screw, the head of the screw 79 being disposed in abutting relationship with the outer end of the sleeve 71.

In performing a machining operation such, for instance, as cutting a depression or slot 80 of predetermined length, width and depth in the workpiece 21, the several dimensions of the slot may be established accurately and readily by means of the various adjustable micrometer dial mechanisms of the present invention. As shown in Fig. 1, and as previously explained, the head elevating screw, the knee elevating screw, the saddle cross feed screw, and the table feed screw are each provided with a graduated micrometer dial mechanism 33 adapted to be actuated, respectively, by rotation of hand wheel 22, hand crank 23, hand wheel 24 and hand crank 25. After the workpiece 21 has been clamped to the table 18, as shown, the several movable elements of the machine may be adjusted either manually or by power to position the cutter 20 directly above a starting point for the slot 80 to be machined in the workpiece. With the cutter positioned to barely contact the workpiece, the cooperating dial mechanism 33 is first set at zero after which the spindle 13 may be fed downwardly by manipulating the hand wheel 22 to sink the cutter 20 the proper depth into the workpiece 21, as indicated by the cooperating dial 33.

To insure accurate measurement of the length of the slot 80, for example, the operator should first set the dial 33 associated with the table feed screw 26 to the zero position. This is readily accomplished by grasping a knurled flange 81 formed on the graduated dial element 60 and withdrawing the dial element against the action of the resilient coil spring 66 until the serrations 62 of the dial element are free from clutching engagement with the serrations 57 formed on the dial collar 47. The dial element 60 may then be turned in either direction until the zero mark of a scale or series of graduations 82 etched on the periphery of the dial element is aligned with the indicator mark 42 on the stationary indicator plate 34. The retracting force on the element 60 may then be relieved whereupon the serrations 62 will be urged automatically into interlocking meshing engagement with the serrations 57 under action of the coil spring 66. With the dial thus set at zero position, the operating crank handle 25 may be pushed inwardly to slide the sleeve 71 and the bearing 74 along the reduced end of the feed screw 26 against the action of the coil spring 77 until the clutch teeth 70 on the sleeve 71 engage the clutch teeth 69 on the sleeve 43 pinned to the feed screw 26. Manual rotation of the crank handle 25 in a clockwise direction while maintaining pressure thereon to retain the clutch in engagement will result in feeding movement of the table from left to right as viewed in Fig. 1.

The measure of the advance of the table may be ascertained directly by reading the dial graduations 82 against the fixed zero mark 42. In the present instance, the feed screw has four threads to the inch so that one revolution of the screw represents an actual advance of the table of one-fourth inch. The dial element 60 is preferably provided with two hundred and fifty graduations equally spaced around its circumference, so that the distance between two successive graduation marks represents accurately an advance of the table of one-one thousandths of an inch.

Accordingly, by turning the feeding crank 25 while observing the graduated dial 60, the operator may mill the slot 80 accurately to any desired length. The total length of the slot may be ascertained readily either by means of a scale or by counting the full turns of the dial 60, each turn representing one-fourth inch, and adding the final reading of the dial in thousandths of an inch. If the slot being milled is relatively long, the feeding movement may be effected by power throughout the greater part of its length, the power drive being tripped out near the end of the slot and the feeding movement then continued manually until the predetermined graduation mark on the dial 60 registers with the stationary indicator mark. After the slot is completed, the cutter 20 may be withdrawn by elevating the head 12, and the table 18 then moved to another position for a subsequent operation. For example, the table may be moved in reverse direction at rapid traverse rate to bring a new part of the workpiece under the cutter, the dial 60 remaining in its adjusted position by virtue of the positive clutching connection afforded by the interlocking serrations regardless of the inertial forces resulting from the sudden reversal to movement at rapid traverse rate.

The dials 33 applied to the knee elevating screw mechanism actuated by the crank handle 23, and to the head elevating mechanism actuated by the hand wheel 22, serve in a manner identical with that of the table feed screw dial to provide means for obtaining accurately measured depths of cuts in the workpiece.

The dial 33 applied to the saddle cross feed screw mechanism, actuated by the hand wheel 24, likewise serves in a manner identical with that of the table feed screw dial to provide means for obtaining accurately measured cross feed movement of the saddle to afford precise lateral adjustment of the workpiece 21 with respect to the cutter 20.

The serrations 57 and 62 formed respectively on the dial collar 47 and on the graduated dial 60 are clearly illustrated in Fig. 3 of the drawings and are preferably of saw tooth shape constituting jaw clutch elements. The number of tooth on one toothed clutch member is made equal to the number of teeth on the other clutch member to provide a simple and effective sliding interlocking engagement between the parts. This permits rotative adjustment of the graduated dial 60 with respect to the dial collar 47, when the graduated dial 60 is retracted against the action of the coil spring 66 to withdraw the serrations 62 from engagement with the serrations 57, to any angular position of engagement of the complementary teeth.

The graduations 82 on the dial 60 are clearly illustrated in Fig. 4 of the drawings. Preferably, the number of clutching serrations in the interlocking elements and the number of graduations on the dial are made equal. Accordingly, rotation of the dial, when free from engagement with the collar, through any given number of graduations will effect an angular relative adjustment between the dial 60 and the dial collar 47 of a corresponding number of serrations. Consequently, upon release of the dial, the coil spring 66 will effect axial movement of the dial 60 automatically into positive interlocked engagement with the dial collar 47 at the adjusted position.

In the event that the zero mark of the dial graduations 82 fails to align itself accurately with the indicator mark 42 on the fixed plate 34 when adjusting the dial to zero position, the amount of the discrepancy will ordinarily be less than one-half of a graduation or less than one-half of one thousandths of an inch. This amount of variation may be compensated for under ordinary conditions by estimating the space between the zero mark on the dial and the fixed indicator mark and then terminating the movement of the hand crank when the dial has been moved the desired number of graduations to an estimated position allowing for the original discrepancy between the zero mark and the fixed indicator mark.

This discrepancy between the zero mark and the fixed indicator mark is caused by the fact that the dial collar 47 rotates as a unit with the feed screw 26 and therefore does not necessarily stop with the serrations at a position where the zero mark of the dial and the fixed indicator mark may be placed in exact register. To provide for establishing the initial zero setting of the dial with a high degree of accuracy, an adjustable indicator plate 83, shown in Fig. 5 of the drawings, may be utilized to permit the indicator mark on the plate to be accurately aligned with the zero mark on the graduated dial irrespective of the position in which the serrated dial collar 47 may come to rest. The inclusion in the mechanism of this form of adjustable indicator plate eliminates the necessity of approximating any reading, and as a result, an accurate measure of movement may be obtained from direct readings on the dial. As shown, the adjustable indicator plate 83 is applied to the flattened portion 41 of the fixed plate 34 by means of a pair of retaining screws 84 which pass respectively through slots 85 formed in the plate 83. When the screws 84 are loosened, the plate may be slid toward one side or the other until the indicator mark 42 on the plate is in exact register with the zero mark of the series of graduations on the dial 60, the dial having been previously disengaged from the dial collar 43 and rotated to bring its zero mark into approximate alignment with the indicator mark 42 on the plate 34. After the marks have been aligned accurately, the screws 84 may be tightened and the indicator plate 83 will then be anchored in properly adjusted position for starting the measure of movement of the machine element exactly from zero.

From the foregoing detailed description of a practical working embodiment of the invention, it will be apparent that there has been provided a novel and convenient precision indicating mechanism in the form of an improved adjustable micrometer dial for precisely measuring the movement of an element of a machine tool, the dial being arranged for angular adjustment and especially adapted to resist displacement from its adjusted position by inertial forces resulting from power operation of the machine.

Although a single embodiment of the invention, with a modified form of an adjustable zero plate, has been set forth in considerable detail to constitute a full disclosure, it is to be understood that persons skilled in the art may utilize the novel principles here taught, in apparatus differing in construction from the particular mechanism here described, without departing from the spirit and scope of the invention as defined in the subjoined claims.

The invention is hereby claimed as follows:

1. In a machine tool, in combination, a supporting structure, a machine element movably mounted on said supporting structure, a feed mechanism for effecting movement of said machine element, an adjustable micrometer dial mechanism adapted to indicate accurately the measure of movement of said machine element, said dial mechanism comprising, a member fixedly attached to an element of said feed mechanism, a second member adapted for adjustable association with said fixed dial member, claw clutch means for releasably retaining said members in adjusted position, and hand operated means for driving said feed mechanism to effect movement of said machine element and said dial mechanism, whereby the measure of movement of said machine element is indicated accurately by said dial mechanism.

2. In a machine tool, in combination, a supporting structure, a machine element movably mounted on said supporting structure, a feed mechanism for effecting movement of said machine element, power means for driving said feed mechanism, manual means for driving said feed mechanism, an adjustable micrometer dial mechanism operatively associated with said feed mechanism, said dial mechanism comprising, a member fixedly mounted on an element of said feed mechanism, a second member adapted for association with said fixed dial member in selected position of relative rotative adjustment, and claw clutch means for releasably retaining said dial members in operative relationship in their selected position of adjustment, whereby the measure of movement of said machine element is indicated accurately by said dial mechanism.

3. In a milling machine, the combination with a column, a tool support adjustably mounted on said column, a work support slidably mounted on said column, said work support including as elements a knee, a saddle, and a table, said work support elements being adapted for independent movement with respect to each other, a feed mechanism for effecting movement of each of said elements, and means adapted for manual movement whereby driving relationship between said selected element and said associated feed mechanism may be established, of an adjustable micrometer dial associated with said feed mechanism, said dial mechanism including a member fixedly mounted on an element of said feed mechanism, another member of said dial mechanism adapted for selective rotative positioning with respect to said fixed member, toothed clutch means for retaining said members in selected position of adjustment, and means on said adjustable dial member for indicating accurately the measure of movement of said selected adjustable work support under the action of said associated feed mechanism.

4. In a milling machine, the combination with a column, a tool support, a work support adjustably mounted on said column, said work support including a knee adapted for vertical movement on said column, a saddle adapted for horizontal movement on the knee toward and from the column, and a table adapted for transverse movement on the saddle, a feed mechanism for each of said work support elements, manually operable means associated with each of said feed mechanisms, of an adjustable micrometer dial mechanism associated with each of said feed mechanisms, said dial mechanisms each including a member fixedly mounted on an element of a feed mechanism, another member of said dial mechanism adapted for selective rotative positioning with respect to said fixed dial member, jaw clutch means for retaining said dial members in selected position of relative adjustment, means on said adjustable dial member for indicating the measure of movement of its associated work support element, and a hand operated element for effecting movement of a selected work supporting element through its associated feed mechanism, whereby the measure of movement of said work supporting element is indicated accurately by the movement of said dial.

5. In a machine tool, in combination, a supporting structure, a machine element movably mounted on said supporting structure, a feed mechanism for effecting movement of said machine element, power means for driving said feed mechanism at rapid rate, means for changing the rate and direction of power movement of said feed mechanism, an adjustable micrometer dial mechanism operatively associated with said feed mechanism, said dial mechanism including, a dial member fixedly mounted on an element of said feed mechanism, a second dial member operatively associated with said first dial member, said second dial member being adapted for rotative adjustment with respect to said first dial member, graduations on said second dial member adapted to indicate the measure of movement of said machine element, claw clutch means for releasably retaining said dial members positively in predetermined relationship in manner to resist displacement thereof by inertial forces resulting from power operation of said feed mechanism, and hand operated means for effecting movement of said feed mechanism and dial mechanism at slow speed whereby the measure of movement of said machine element is indicated accurately by said dial mechanism.

6. An adjustable micrometer dial mechanism adapted for association with the feed mechanism of a movable machine element, said dial mechanism comprising a member adapted for fixed attachment to an element of the feed mechanism, another member adapted for rotative adjustment with respect to said fixed member, dog clutch means for retaining said members in selected position of adjustment, a series of graduations on said adjustable member, an indicator on the movable machine element readable against said graduations, means for adjusting the rotatable dial member to a desired position when the movable machine element is at a terminal position, and manually operable means for effecting movement of the machine element and adjusted micrometer dial, whereby the measure of movement of the machine element is readable directly from the graduations on said dial.

7. An adjustable micrometer dial mechanism adapted for association with the feed mechanism of a movable machine element, said dial mechanism comprising, a member adapted for fixed attachment to an element of the feed mechanism, another member adapted for selective rotative positioning with respect to said fixed member, positive toothed clutch means for releasably retaining said members in selected position of adjustment, and means on said adjustable member adapted to register with an indicator on said movable machine element, whereby the measure of movement of said machine element is indicated accurately by said means on said adjustable dial member.

8. An adjustable micrometer dial mechanism adapted for association with the feed mechanism of a movable machine element, said dial mechanism comprising, a member adapted for fixed attachment to an element of the feed mechanism, another member adapted for selective rotative positioning with respect to said fixed member, coacting claw clutch means on each of said members adapted to retain said members positively in selected position of adjustment, a series of graduations on said adjustable dial member, and a cooperating indicator on said movable machine element, whereby the measure of movement of said machine element may be ascertained accurately by reading the graduations on said adjustable dial member against said indicator.

9. An adjustable micrometer dial mechanism adapted for association with the feed mechanism of a movable machine element, said dial mechanism including a pair of cooperating members, one of said members being adapted for fixed attachment to an element of the feed mechanism, the other of said members being adapted for rotative adjustment with respect to said fixed member, toothed clutch means for retaining said members in selected position of rotative adjustment, a series of graduations on said adjustable member, an indicator on the movable machine element readable against said graduations, and manual means for effecting movement of the machine element and dial mechanism, whereby the measure of movement of the machine element is directly readable on said dial mechanism.

10. An adjustable micrometer dial mechanism adapted for association with the feed mechanism of a movable machine element, said dial mechanism including a pair of cooperating members, one of said members being adapted for fixed attachment to an element of the feed mechanism, the other of said members being adapted for rotative adjustment with respect to said fixed member, jaw clutch means for retaining said members in selected position of rotative adjustment, a series of graduations on said adjustable member, an indicator on the movable machine element readable against said graduations, means for adjusting the position of said indicator, means for releasably retaining said indicator in adjusted position, and manual means for effecting movement of the machine element and dial mechanism, whereby the measure of movement of the machine element is directly readable on said dial mechanism.

11. In an adjustable position indicating apparatus for association with a rotatable element of a machine tool or the like, a dial mounted for rotation by said rotatable element and presenting angularly arranged indicia, dog clutch means connected with said rotatable element for positively engaging said dial at any one of a plurality of predetermined angular positions, and means for releasably retaining said dial in positive engagement with said engaging means, whereby said dial may be adjusted angularly relative to said rotatable element and locked positively against angular displacement in the adjusted position.

12. In an adjustable position indicating apparatus for association with a rotatable element of a machine tool or the like, a dial presenting angularly arranged indicia and provided with a toothed portion, means fixed on said rotatable element for positively engaging the toothed portion of said dial at any one of a plurality of predetermined angular positions, and means releasably retaining said toothed dial in positive engagement with said engaging means, whereby said dial may be adjusted angularly relative to said rotatable element and locked positively against angular displacement in the adjusted position.

13. In a machine tool having relatively movable parts, means for effecting relative movement of said parts including a rotatable member, means associated with said rotatable member for indicating the position of said parts including an indicating dial presenting indicia and provided with circumferentially arranged positioning teeth, a cooperating element fixed on said rotatable member and presenting teeth complementary to the teeth of said dial, and means for releasably retaining said toothed dial in locking engagement with said toothed element, whereby said dial may be adjusted angularly relative to said rotatable member and positively locked against angular displacement from its adjusted position.

14. In a machine tool having relatively movable parts, means for effecting relative movement of said parts including a rotatable member, means associated with said rotatable member for indicating the position of said parts including an indicating dial presenting indicia and provided with circumferentially arranged positioning teeth, a cooperating element fixed on said rotatable member and presenting teeth complementary to the teeth of said dial, means for releasably retaining said toothed dial in locking engagement with said toothed element, an indicator disposed to coact with said dial indicia, and means for adjusting the position of said indicator, whereby said dial may be adjusted angularly relative to said rotatable member and positively locked against angular displacement from its adjusted position after which said indicator may be adjusted into precisely predetermined relationship with the indicia of said dial.

15. An adjustable distance measuring dial for measuring the extent of movement of a power driven machine element subject to sudden changes in velocity, comprising a hub member operatively connected to rotate in accordance with movement of said machine element, said hub member presenting angularly spaced locking teeth, a dial presenting distance measuring indicia and having means adapted to engage said locking teeth on said hub at any one of a plurality of angularly spaced positions in manner to prevent angular displacement between said dial and said hub by inertial forces resulting from sudden changes in rotational velocity, and means releasably retaining said dial in locked engagement with said hub whereby said dial may be released for adjusting movement to another angular position relative to said hub and then locked against inertial displacement from its adjusted position.

16. An adjustable distance measuring apparatus for indicating the distance moved by a machine element that is subject to violent changes in velocity, comprising a member rotatable in accordance with movement of said machine element said member presenting angularly spaced serrations, a dial member presenting complementary serrations adapted to engage said serrations of said rotatable member at any one of a plurality of angularly spaced positions, said dial member presenting distance measuring indicia spaced to correspond with said angularly spaced positions of engagement, and means releasably retaining said complementary serrations in engagement in manner to prevent angular displacement of said dial by inertial forces arising from changes in velocity of said machine element, said retaining means being releasable to permit angular adjustment of said dial relative to said rotatable member through a selected multiple of said indicia and reengageable to retain said dial accurately in its adjusted position.

17. In an adjustable distance measuring apparatus for association with a movable element of a machine tool or the like, a rotatable element for effecting movement of said machine tool element, a dial presenting angularly arranged distance measuring indicia and provided with a toothed portion, means on said rotatable element adapted to positively engage the toothed portion of said dial at any one of a plurality of predetermined angular positions, and means releasably retaining said positive engagement between said toothed dial and said rotatable element, whereby said dial may be released for angular adjustment relative to said rotatable element and then locked against relative rotation in the adjusted position.

18. In a machine tool having relatively movable parts, means for effecting relative movement of said parts including a rotatable member, means associated with said rotatable member for indicating the distance through which relative movement of said parts occurs including an indicating dial presenting distance measuring indicia and provided with angularly arranged locking teeth, a cooperating element on said rotatable member presenting complementary locking teeth, and means to releasably retain locking engagement between the teeth of said dial and the teeth on said cooperating element, whereby said dial may be adjusted angularly relative to said element on said rotatable member and then locked against angular displacement from its adjusted position.

19. In an adjustable position indicating apparatus for an element of a machine tool or the like, a dial associated with said element and presenting position indicating indicia, claw clutch means on said element for positively engaging said dial at any one of a plurality of predetermined angular positions, and means for releasably retaining said dial in positive engagement with said engaging means, whereby said dial may be adjusted angularly relative to said engaging means and then locked positively against angular displacement in the adjusted position.

20. In a machine tool having relatively movable parts, means for effecting relative movement of said parts including a rotatable member, means associated with said rotatable member for indicating the position of said parts including an indicating dial presenting indicia and provided with angularly arranged positioning teeth, a cooperating element mounted on said rotatable member and presenting teeth complementary to the teeth of said dial, and means for releasably retaining said toothed dial in locking engagement with said toothed element, whereby said dial may be adjusted angularly relative to said rotatable member and positively locked against angular displacement from its adjusted position.

21. Distance measuring apparatus comprising a dial presenting distance indicating indicia and provided with a plurality of projecting abutments angularly spaced to correspond with the angular spacing of said indicia, and a cooperating hub rotatable to effect movement through a distance to be measured said hub presenting complementary angularly spaced abutments adapted to interlock with the abutments on said dial upon axial movement thereof into engagement, the arrangement being such that said dial turns as a unit with said hub when said abutments are engaged to indicate accurately the distance of movement, said dial being adjustable relative to said hub upon axial disengaging movement thereof through any multiple of the angle between adjacent indicia.

22. In a distance measuring apparatus for a movable machine element, a member adapted when rotated to effect movement of said machine element, a hub carried by said rotatable member said hub presenting abutment elements, a distance indicating dial provided with complementary abutment elements disposed to be moved axially into interlocking engagement with the abutment elements of said hub, and means to retain said dial in interlocking engagement with said hub.

23. An adjustable measuring dial mechanism comprising a rotatable hub member presenting locking projections, a dial member provided with complementary locking projections adapted to be moved axially into interlocking relationship with said projections on said hub in manner to provide for unitary movement of said dial with said hub, and resilient means disposed to retain said dial in interlocked relationship with said hub and permitting axial unlocking movement of said dial for adjusting its angular position relative to said hub.

24. In a measuring apparatus, a rotatable hub presenting serrations, a distance indicating dial provided with complementary serrations disposed to interlock with the serrations on said hub upon axial movement into engagement therewith, resilient means arranged to hold said dial in interlocking relationship with said hub for rotation therewith as a unit, and means on said dial for retracting it axially in opposition to said resilient means to disengage said serrations for turning said dial relative to said hub.

25. An adjustable dial mechanism for measuring, comprising a rotatable hub member presenting peripheral serrations, a dial member provided with complementary internal serrations adapted to be moved axially into interlocking engagement with the serrations on said hub at any one of a plurality of angularly disposed positions and in manner positively preventing angular displacement therebetween, and means for retaining said dial in engagement with said hub, said retaining means being releasable to permit axial disengaging movement of said dial for the purpose of angular adjustment thereof relative to said hub.

26. An adjustable dial mechanism for measuring, comprising a rotatable member presenting interlocking elements, a dial member presenting complementary interlocking elements disposed to be engaged with the interlocking elements of said rotatable member at a plurality of angularly spaced positions in manner positively preventing relative angular movement therebetween, and resilient means disposed to retain said dial in interlocking engagement with said rotatable member but permitting withdrawal of said dial from said engagement for the purpose of adjusting it angularly relative to said rotatable member.

27. In distance measuring apparatus for a machine tool, a rotatable member arranged to effect movement of a machine part, an interlocking toothed clutch member fixed on said rotatable member, a distance indicating dial rotatably mounted on said rotatable member said dial presenting complementary clutching means adapted to engage said interlocking toothed clutch member at any one of a plurality of angularly spaced positions in manner positively preventing relative rotation therebetween, and means to disengage said dial from said interlocking toothed clutch member to permit adjustment of said dial relative to said rotatable member.

28. In a position indicating device for a machine tool having a rotatable support moving member, a dial rotatably mounted on said support moving member, jaw clutch means on said member for engaging said dial at any one of a plurality of angularly spaced positions in manner to lock it positively against relative angular movement, said jaw clutch means being releasable upon axial movement of said dial, and means for retaining said dial in its locked axial position, said retaining means being releasable to permit intentional axial movement of said dial to unlock it for adjustment to another angular position.

29. An adjustable measuring dial mechanism comprising a rotatable member presenting interlocking elements, a dial member presenting complementary interlocking elements arranged to be engaged with said interlocking elements of said rotatable member at any one of a plurality of angularly spaced positions in manner to provide for unitary movement of said dial with said rotatable member, manually operable means arranged to provide for disengaging said dial from said rotatable member for angular adjustment therebetween, and automatically operating means arranged to reengage said dial with said rotatable member upon release of said manually operable disengaging means.

RALPH E. SAVING.
EDWARD GUETZKOW.